United States Patent
Koskela et al.

(10) Patent No.: US 12,520,182 B2
(45) Date of Patent: Jan. 6, 2026

(54) METHODS AND APPARATUSES FOR BEAM MANAGEMENT REPORTING

(71) Applicant: NOKIA TECHNOLOGIES OY, Espoo (FI)

(72) Inventors: Timo Koskela, Oulu (FI); Mihai Enescu, Espoo (FI); Sami-Jukka Hakola, Kempele (FI); Juha Pekka Karjalainen, Oulu (FI); Jorma Johannes Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 487 days.

(21) Appl. No.: 17/799,113

(22) PCT Filed: Feb. 11, 2020

(86) PCT No.: PCT/IB2020/051093
§ 371 (c)(1),
(2) Date: Aug. 11, 2022

(87) PCT Pub. No.: WO2021/161065
PCT Pub. Date: Aug. 19, 2021

(65) Prior Publication Data
US 2023/0164607 A1    May 25, 2023

(51) Int. Cl.
*H04W 24/10* (2009.01)
(52) U.S. Cl.
CPC ................... *H04W 24/10* (2013.01)
(58) Field of Classification Search
CPC .................................................... H04W 24/10
See application file for complete search history.

(56) References Cited

U.S. PATENT DOCUMENTS

| 10,306,597 | B2* | 5/2019 | Onggosanusi | ....... H04B 7/0626 |
| 11,539,421 | B2* | 12/2022 | Kang | ................... H04B 7/0695 |
| 2019/0090227 | A1 | 3/2019 | Tsai et al. | |
| 2019/0150013 | A1 | 5/2019 | Zhang et al. | |
| 2020/0092739 | A1* | 3/2020 | Yang | ..................... H04L 5/0057 |
| 2022/0279612 | A1* | 9/2022 | Taherzadeh Boroujeni | ................ H04W 76/11 |

FOREIGN PATENT DOCUMENTS

| CN | 107852630 A | 3/2018 |
| CN | 107889130 A | 4/2018 |
| CN | 110521134 A | 11/2019 |
| EP | 3 461 025 A1 | 3/2019 |
| EP | 3509340 A1 | 7/2019 |

(Continued)

OTHER PUBLICATIONS

Office Action dated Dec. 15, 2022, corresponding to India Patent Application No. 202247050797.

(Continued)

*Primary Examiner* — Jasper Kwoh
(74) *Attorney, Agent, or Firm* — Carter, DeLuca & Farrell LLP

(57) ABSTRACT

Systems, methods, apparatuses, and computer program products for beam management (BM) reporting are provided. One method may include determining, at a UE, that reporting configuration(s) need to be activated, and providing, to a network, an indication to activate the reporting configuration(s).

1 Claim, 6 Drawing Sheets

(56) References Cited

FOREIGN PATENT DOCUMENTS

| JP | 2019531654 A | 10/2019 |
|---|---|---|
| WO | 2019/193239 A1 | 10/2019 |

OTHER PUBLICATIONS

Notification of Reason(s) for Rejection issued by the Japanese Patent Office in relation to Japanese Application No. 2022-548992 dated Oct. 2, 2023 (4 pages) along with English language translation (6 pages).
International Search Report and Written Opinion dated Oct. 14, 2020 corresponding to International Patent Application No. PCT/IB2020/051093.
Samsung, "New WID: Further enhancements on MIMO for NR," RP-193133, 3GPP TSG RAN Meeting #86, Sitges, Spain, Dec. 9-12, 2019.
MediaTek Inc., "New WID: UE Power Saving Enhancements," RP-193239, 3GPP TSG RAN Meeting #86, Sitges, Spain, Dec. 9-12, 2019.
Office action received for corresponding Indonesian Patent Application No. P00202209621, dated May 29, 2024, 2 pages of office action and 2 pages of translation available.
Office action received for corresponding Japanese Patent Application No. 2022-548992, dated Jul. 25, 2024, 2 pages of office action and 2 pages of Summary available.
"NR L1-RSRP measurements and Reporting", 3GPP TSG-RAN WG4 Meeting#89, R4-1815435, Agenda: 7.11.8.2, Nokia, Nov. 12-16, 2018, 4 pages.
3GPP TS 36.133 V16.4.0 (Dec. 2019), Technical Specification, 3rd Generation Partnership Project; Technical Specification Group Radio Access Network; Evolved Universal Terrestrial Radio Access (E-UTRA); Requirements for support of radio resource management (Release 16), Dec. 2019.
"Downlink Mobility Measurements in Connected Mode", 3GPP TSG-RAN WG2 Meeting #96, R2-167711, Agenda. 9.3.1.1.1, Nokia, Nov. 14-18, 2016, 6 pages.
Office action received for corresponding Indonesian Patent Application No. P00202209621, dated Mar. 13, 2025, 2 pages of office action and 2 pages of translation available.
Office action received for corresponding Chinese Patent Application No. 202080098376.4, dated Mar. 13, 2025, 12 pages of office action and no page of translation available.
Office Action received for corresponding Chinese Patent Application No. 202080098376.4, dated Jul. 29, 2025, 10 pages of office action and no page of translation available.
Office Action received for corresponding European Patent Application No. 20708178.7, dated Jun. 26, 2025, 5 pages.

\* cited by examiner

METHODS AND APPARATUSES FOR BEAM MANAGEMENT REPORTING

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for beam management (BM) reporting, for example, in layer 1/layer 2 (L1/L2)-centric mobility.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

One embodiment is directed to an apparatus that may include at least one processor and at least one memory comprising computer program code. The at least one memory and computer program code may be configured, with the at least one processor, to cause the apparatus at least to determine that at least one reporting configuration needs to be activated, and to provide, to a network, an indication to activate the at least one reporting configuration.

Another embodiment is directed to a method, which may include determining, at a user equipment, that at least one reporting configuration needs to be activated. The method may also include providing, to a network, an indication to activate the at least one reporting configuration.

In a variant, the method may also include receiving, from the network, at least one activation of beam management reporting configuration or at least one configuration for beam management reporting configuration, and performing beam management reporting according to the activated at least one beam management reporting configuration.

In some variants, the method may also include transmitting, to the network, a beam management report according to the activated at least one beam management reporting configuration.

Another embodiment may be directed to an apparatus that may include means for determining that at least one reporting configuration needs to be activated, and means for providing, to a network, an indication to activate the at least one reporting configuration.

Another embodiment is directed to an apparatus that may include at least one processor and at least one memory comprising computer program code. The at least one memory and computer program code may be configured, with the at least one processor, to cause the apparatus at least to receive an indication, from at least one user equipment, to activate at least one reporting configuration, to determine at least one beam management reporting configuration that the at least one user equipment should activate, and to signal the determined at least one beam management reporting configuration to the at least one user equipment.

Another embodiment may be directed to a method that may include receiving an indication, from at least one user equipment, to activate at least one reporting configuration. The method may also include determining at least one beam management reporting configuration that the at least one user equipment should activate, and signaling the determined at least one beam management reporting configuration to the at least one user equipment.

Another embodiment may be directed to an apparatus that may include means for receiving an indication, from at least one user equipment, to activate at least one reporting configuration, means for determining at least one beam management reporting configuration that the at least one user equipment should activate, and means for signaling the determined at least one beam management reporting configuration to the at least one user equipment.

BRIEF DESCRIPTION OF THE DRAWINGS

For proper understanding of example embodiments, reference should be made to the accompanying drawings, wherein.

DETAILED DESCRIPTION

Figure 1:
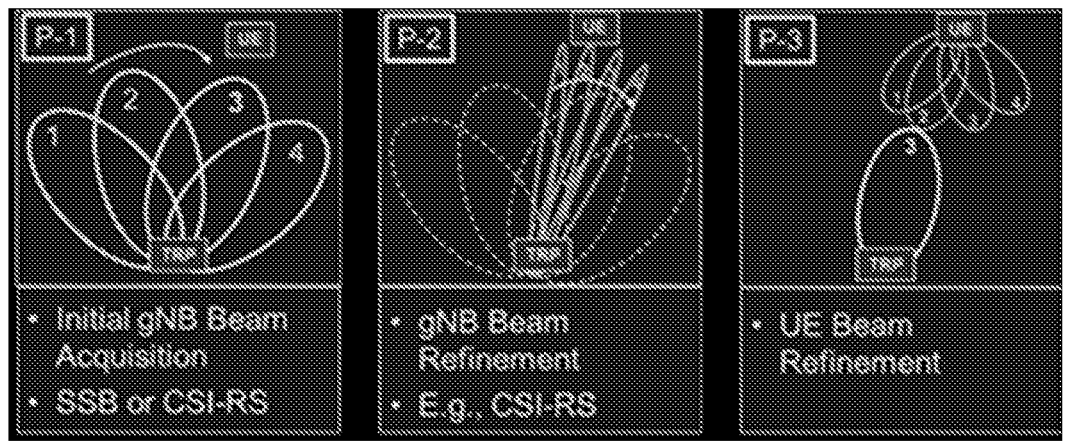
FIG. 1 illustrates an example of downlink beam management procedures, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for beam management (BM) reporting, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments may generally relate to $3^{rd}$ generation partnership project (3GPP) NR development. More specifically, some embodiments may relate to establishing inter-cell mobility using beam management procedures. For NR multiple-input multiple-output (MIMO), the beam management related objectives (including the need to support L1/L2-centric inter-cell mobility) may include enhancements on multi-beam operation that mainly target frequency range 2 (FR2) but that are also applicable to frequency range 1 (FR1). For example, features to facilitate more efficient (lower latency and overhead) downlink (DL)/uplink (UL) beam management to support higher intra- and L1/L2-centric inter-cell mobility and/or a larger number of configured transmission configuration indication (TCI) states may be identified. This may include common beam for data and control transmission/reception for DL and UL, unified TCI framework for DL and UL beam indication, and/or enhancements for signaling mechanisms to improve latency and efficiency with more usage of dynamic control signaling. Furthermore, features to facilitate UL beam selection for UEs equipped with multiple panels, considering UL coverage loss mitigation due to maximum permissible exposure (MPE), based on UL beam indication with the unified TCI framework for UL fast panel selection may be identified.

Beam management is a set of functionalities to assist a UE in setting its reception (RX) and transmission (TX) beams for DL receptions and UL transmissions, respectively. The functionalities can be roughly categorized into four categories: (1) beam indication, (2) beam acquisition, measurements and reporting, (3) beam recovery, and (4) beam tracking and refinement. Beam indication generally assists a UE to set its RX and TX beam properly for the reception of DL and transmission of UL, respectively. Beam acquisition, measurements and reporting refers to procedures for providing a gNB with knowledge about feasible DL and UL beams for the UE. Beam recovery may be used for rapid link reconfiguration against sudden blockages, i.e., fast re-aligning of gNB and UE beams. Beam tracking and refinement refers to a set of procedures to refine gNB and UE side beams.

Regarding downlink beam management, and especially for beam acquisition, measurements and reporting, the following beam management procedures may be supported within one or multiple transmission and reception points (TRPS). FIG. 1 illustrates an example of these DL beam management procedures. As illustrated in the example of FIG. 1, P-1 is used to enable UE measurement on different TRP Tx beams to support selection of TRP Tx beams/UE Rx beam(s). For beamforming at TRP, this typically includes a intra/inter-TRP Tx beam sweep from a set of different beams. For beamforming at UE, this typically includes a UE Rx beam sweep from a set of different beams. As further illustrated in the example of FIG. 1, P-2 is used to enable UE measurement on different TRP Tx beams to possibly change inter/intra-TRP Tx beam(s). This may be from a possibly smaller set of beams for beam refinement than in P-1. It is noted that that P-2 can be a special case of P-1. As also illustrated in the example of FIG. 1, P-3 is used to enable UE measurement on the same TRP Tx beam to change UE Rx beam in the case UE uses beamforming.

Regarding downlink beam indication, a quasi-co-location (QCL) indication functionality has been defined. As an example of QCL type, type-D), to receive a certain physical signal or physical channel, the UE is either configured with or the UE implicitly determines a source/reference signal that the UE has received and measured earlier which defines how to set RX beam for the reception of the downlink (target) physical signal or channel to be received. In order to provide a UE with QCL characteristics for the target signal (to be received) a transmission coordination indication (TCI) framework has been defined using which UE can be configured TCI state(s) to provide the UE with source reference signals (RS(s)) for determining QCL characteristics. Each TCI state may include one or two source RSs that provide UE QCL TypeA, TypeB, TypeC and/or TypeD parameters. The different types may provide the parameters as follows:

QCL-TypeA: {Doppler shift, Doppler spread, average delay, delay spread}
QCL-TypeB: {Doppler shift, Doppler spread}
QCL-TypeC: {Doppler shift, average delay}
QCL-TypeD: {Spatial Rx parameter}.

Figure 2:
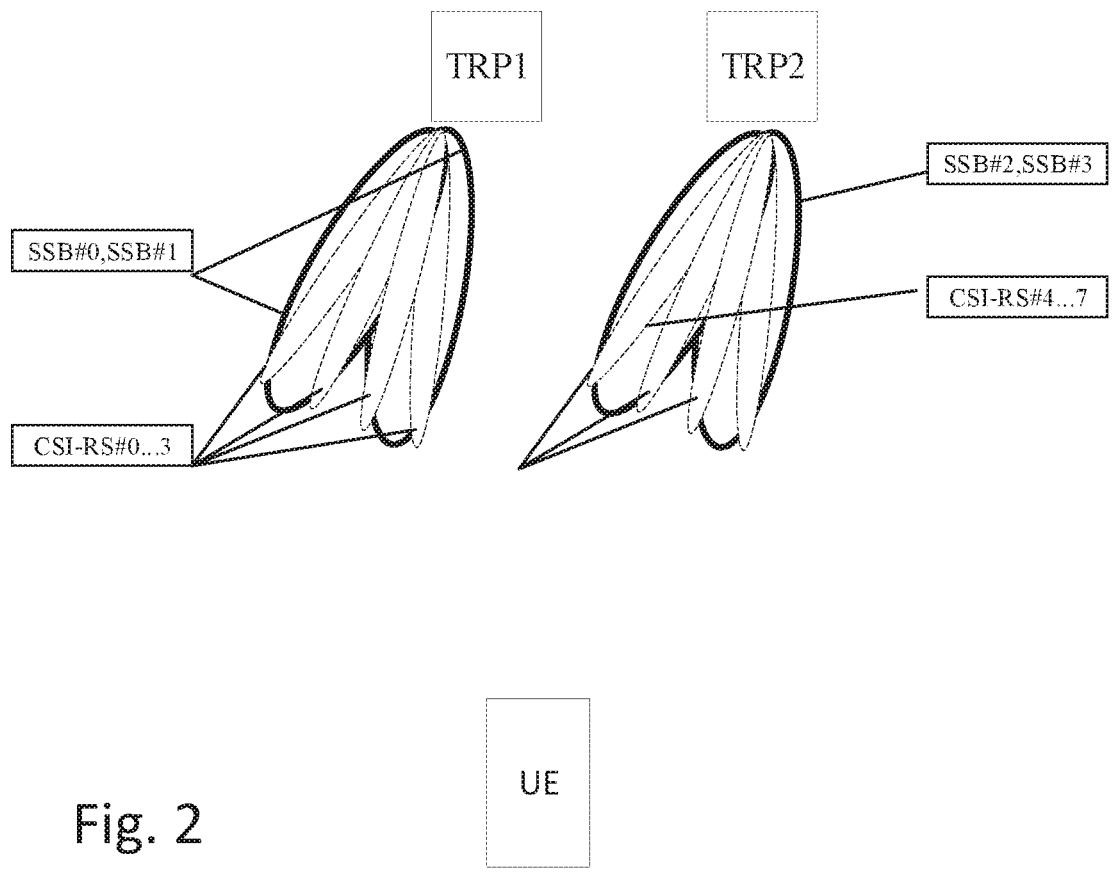
FIG. 2 illustrates an example deployment scenario of a wireless network, according to an embodiment.

FIG. 2 illustrates an example deployment scenario of a wireless network. More specifically, FIG. 2 depicts an example illustration of a reporting configuration scenario that may include two TRPs that transmit synchronization signal and physical broadcast channel (PBCH) block (SSPBCH or SSB) and/or channel state information (CSI)-reference signals (RS). These signals may be used for beam management purposes. The TRPs and the signals transmitted by TRPs may cover a cell, part of the cell or cover one or more cells. One TRP may transmit one or more SSB and may transmit one or more CSI-RS. It is noted that certain embodiments are not limited to any specific configuration or deployment, i.e., number of SSB or CSI-RS beams or TRPs. The TRPs may be identified by an identifier (ID) or the TRPs may not be identified and the TRP associated to a specific DL RS may not be explicitly visible to UE. In the example illustrated in FIG. 2, TRP1 transmits SSBs #0 . . . #1 and CSI-RS #0..CSI-RS #3, and TRP2 transmits SSB #2 and #3 and CSI-RS #4 . . . CSI-RS #7.

Figure 3:
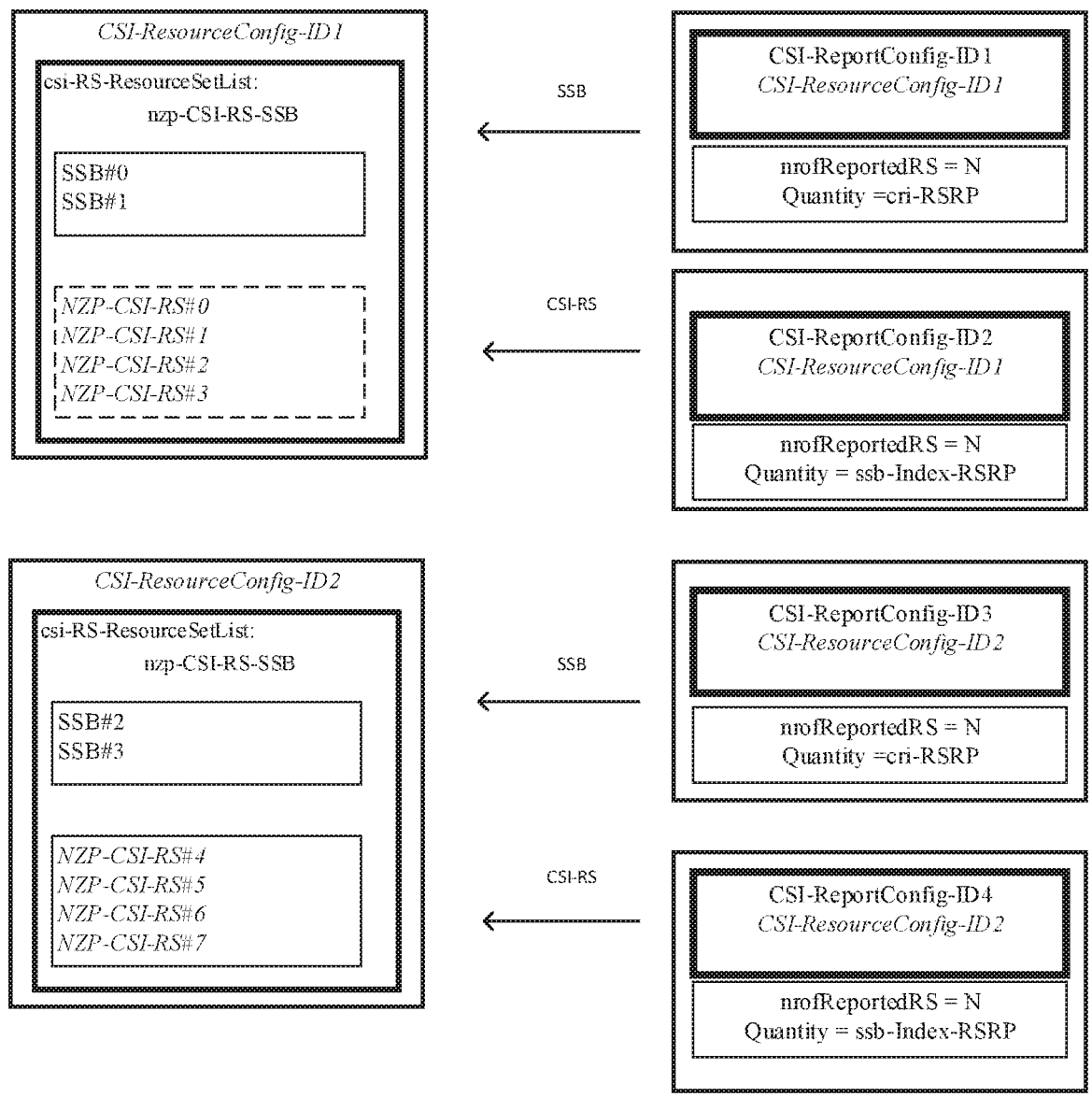
FIG. 3 illustrates an example scenario related to the beam management reporting, according to an embodiment.

FIG. 3 illustrates an example scenario related to the beam management reporting. More specifically, the example of FIG. 3 shows an illustration of a resource/reporting configuration. In the example of FIG. 3, a UE has been configured with CSI-ResourceConfig-ID1 and CSI-ResourceConfig-ID1, i.e., with two resource sets for beam measurements. These sets may include SSB and/or non-zero power (NZP)-CSI-RS signals. The network may configure specific DL RS signals to be so called tracking reference signals (TRS). For each CSI-ResourceConfig, the network may configure one or more reporting settings or reporting configurations (CSI-ReportConfig) associated with specific CSI-ResourceConfig. In the example of FIG. 3, the network has configured for both CSI-ResourceConfig the SSB and CSI-RS reporting. These configurations may be updated by the network using radio resource control (RRC) signaling.

In the context of LTE carrier aggregation (CA) (and as being considered for NR), a UE can be configured to report idle mode CA measurements to the serving cell upon return to connected mode, for example, as described in Section 4.9 of 3GPP TS 36.133. In the context of 3GPP Release-17 UE power saving enhancements, it is proposed to provide information regarding the possible TRS/CSI-RS configuration that is used for UEs in CONNECTED mode.

Current (e.g., Release-15 and Release-16) beam management solutions provide support for intra-cell operation. Therefore, a UE cannot be configured to report non-serving cells using the beam management framework or beam management signalling because the inter-cell mobility is handled by RRC layer (L3 mobility). Now, it has been agreed that support for L1/L2 centric mobility should be defined and specified new signalling mechanism are needed.

Although the current Release-15/16 signalling framework might be extended to support the L1/L2 based inter-cell mobility, the beam management signalling differs from RRC based. Typically, the beam management related beam reporting is carried out with low overhead L1-signaling, namely physical uplink control channel (PUCCH)/physical uplink shared channel (PUSCH), where the network configured the UE with, e.g., periodical resources for one or more reporting settings. When the reporting is configured for beam management purposes, the network knows the amount of resources needed to provide for periodical or aperiodic reporting.

However, in case the BM signalling is used for inter-cell mobility, it may not be beneficial to constantly report neighbour cells due to signalling overhead and, for example, in the case where a UE is not detecting any neighbour cells or the neighbour cells reference signals for beam management (with adequate quality). Furthermore, for NR, in context of secondary cell (SCell) configuration based on IDLE mode measurements, the UE would need to carry out additional measurements and reporting in CONNECTED mode (based on CSI-RS) to be able to configure the proper DL and UL beams for the SCell(s).

One embodiment may be directed to a method for reporting neighbour cell measurements using a BM framework. In an embodiment, when a UE has determined to activate the BM reporting configurations, the UE may trigger uplink signalling to the network. According to an embodiment, the signaling from a UE may indicate that the UE has determined that reporting conditions and/or criteria for at least one non-serving cell BM reporting are fulfilled. In one example, the serving cell and/or non-serving cell reporting configuration may be preconfigured. In certain embodiments, the signaling may be one or more of a dedicated random access channel (RACH) preamble, dedicated scheduling request (SR), normal SR, medium access control (MAC) control element (CE), and/or PUCCH/PUSCH or RRC. According to some embodiments, the signaling may also be initiated when a UE determines to activate the BM reporting and determines that current signaling resources are not sufficient to carry the information, e.g., where insufficient PUCCH/PUSCH resources are allocated by network. Alternatively, a UE may be configured with periodic UL grant to use MAC CE based reporting and similar issue may arise.

In one embodiment, the UE may use the UL signaling to indicate for which cells (Physical Cell Identifier (PCI)/logical cell index in a set of cells) the reporting conditions are fulfilled and/or which of the reporting configurations should be activated. These configuration IDs may correspond to reporting configurations non-serving cells (or simply beam reporting configurations for one or more cells without specific distinction of serving/non-serving cell) or the reporting configurations may correspond to resource configurations that include the one or more non-serving cell DL reference signals for beam reporting. In a more general view, according to some example embodiments, the reporting configurations that a UE determines to activate may be referred to as serving cell configurations, non-serving cell configurations or simply configuration for a specific cell. In one example, the reporting configuration can be associated with reference signals of a TRP of a cell (or just referred with TRP ID or any identifier that can be used to refer to specific TRP, e.g., CORESETpoolIndex). Further, in an embodiment, the UE may indicate, for example in L1/L2 beam report, where the UE reports serving cell beams that the UE has detected/measured non-serving cell beam or beams s with quality above threshold. In certain embodiments, these beams may be associated with the configured reporting configurations (that correspond to resource sets) or just a candidate set of cells (e.g., UE reports just SSB indexes), or in one example to any cell that the UE has detected. In one example, the indication may be, e.g., 1-bit indication in the report format or an identifier of the reporting format. This allows the network the option to activate non-serving cell reporting configuration(s). The network may then decide and signal which configuration(s) the UE activates. In one embodiment, the UE may activate the non-serving cell BM reporting when it determines that the serving cell quality is below a network configured threshold and/or a neighbor cell (that may be e.g. associated with beam management reporting configuration) is above a threshold. For example, the network may configure the UE with a new threshold, such as Non-Serving-Cell-BM-Reporting-Threshold (Threshold_BMReporting). Alternatively or additionally, the UE may be configured to use, or the threshold configured by s-MeasureConfig may be used to determine when to activate the BM reporting. In yet another alternative example, a network may configure UE with RRC level event such as A3/A4 or similar (neighbor cell (quality) becomes better than threshold) to trigger activation/indication to request activation of BM reporting. In one example, when the RRC level event is triggered, UE sends the measurement report or other RRC level message associated to the triggered event to network that may indicate network that specific beam reporting configuration should be activated. In some examples, network may configure separate RRC level measurements and/or reporting configuration for UE to report/indicate that it has measured and determined that a cell has a measured quantity (cell quality in terms of RSRP/RSRQ/SINR) above a threshold (and it may be potentially associated with time-to-trigger timer) or a set of cells that may be preconfigured to UE have the cell quality above threshold. The preconfigured cells may be configured by network by using a measurement configuration which tells UE to explicitly measure (for reporting purposes) specific cells, or the measurement/reporting configuration may be associated with cells that are for example configured as candidates for conditional handover, DAPS (dual active protocol stack) using RRCReconfiguration message. In yet one alternative example network may use RRC pre-configuration (e.g. RRCReconfiguration or other RRC message) for one or more cells, for one ore more cell that are candidates for L1/L2 centric mobility (e.g. mobility where at least some procedures may be performed based on L1/L2 measurement/reporting and/or signaling). n one alternative, a UE may determine the activation of specific reporting configuration based on configured CSI-RS/SSB resources for the reporting configuration. In alternative example, when UE is configured to report cells on RRC according to embodiments herein, it may determine to derive the cell quality using all the transmitted SSBs of a cell or it may be configured to determine cell quality based on subset of SSB. The subset may include the SSBs configured for BM reporting configurations. In one further example, for each of the BM reporting configurations, a specific neighbor cell beam or resource set list (associated to the BM report configuration) threshold may be used. As an example if at least one, or all or N (where the N is the maximum number of reported beams per reporting instance) of the RS listed in the csi-RS-Resource-SetList is above a threshold. Threshold may be set to be common for all the resource list/reporting configurations or it may be per resource/reporting configuration. Furthermore, the threshold may be different for different reporting quantities and reference signal types. In one example, if the reporting configuration indicates to the UE to only report SSBs of a specific resource configuration, the UE may determine the activation conditions only based SSB. In other words, the activation conditions that are evaluated may be based on the configured reporting quantity e.g. SSB-RSRP or CSI-RS-RSRP. Other quantities per reference signal type are not excluded, such as RSRP, SINR or the like. In one alternative, the network (e.g., gNB) may provide activation of the non-serving cell BM reporting, e.g., upon the UE's indication about the preconfigured reporting condition being fulfilled.

Figure 4:
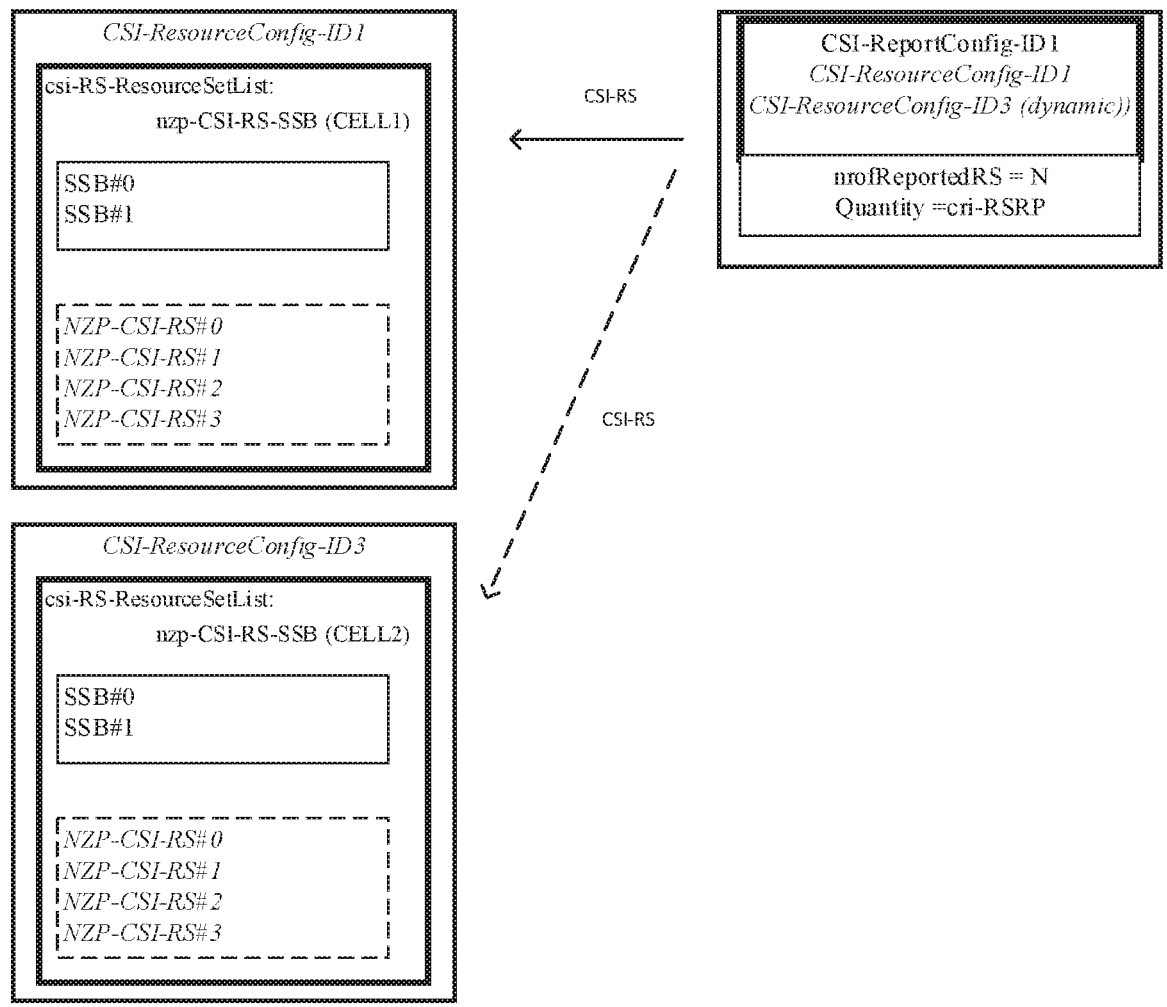
FIG. 4 illustrates an example of linking two resource settings to one reporting configuration identifier, according to an embodiment.

According to one embodiment, there may be a dynamic reporting format where the UE generates combined serving and non-serving cell beam report, where the report may include at least one non-serving cell beam index and quality. As an example, when a UE is configured to report up to N=4 best beams (in terms of the reporting quantity, RSRP/RSRQ) in a reporting instance and it receives a network indication to report non-serving cell beams, the UE may determine to change at least one of the configured reporting configuration(s) (that may be the serving cell BM reporting configuration) so that up to N=2 is reported for the serving cell according to the reporting configuration and up to N=2 is reported for associated non-serving cell resource setting. This can be expanded so that, e.g., N=2 for serving cell, and N=1 per one non-serving cell (up to two cells or two reporting configurations of the same cell or different cell) and so on. This association can be made by linking the reporting configuration to more than one resource setting (serving cell and non-serving cell as illustrated in the example of FIG. 4. More specifically, FIG. 4 illustrates an example of linking two resource settings to one reporting configuration ID. In some embodiments, the network may configure when this reporting is active, or the UE may indicate when it reports using this setting.

In some embodiments, the non-serving cells may include one or more of a set of one or more cells preconfigured for beam management signaling based reporting, the preconfigured cells for conditional handover (CHO), and/or any cell up to N cells that the UE has detected.

In some embodiments, to indicate that resource configuration that is associated with reporting configuration corresponds to resources of another cell/non-serving cell/a TRP, an indication or a field may be included in the RRC configuration (e.g., in the information element) that configures UE measurements and/or reporting. The field may include one or more of a PCI (Physical Cell ID), any identifier that identifies a cell, a logical cell index, a logical index of non-serving cell, a TRP index, and/or BWP identifier. A field may be included in the CSI-ResourceConfig or in a csi-RS-ResourceSetList, or in an individual CSI-RS/SSB resource in the resource list. A field may also be included alternatively or additionally on reporting setting (associated with the resource config). Based on the information provided in the resource configuration and/or reporting setting, the UE may determine at least one of: to measure and report neighbor cell (or non-serving cells/PCI/TRP etc.) resources using beam management procedures, determine whether a specific or all reporting configurations should be activated, determine whether to trigger an indication to the network that specific or all reporting configurations should be activated (or activation conditions are fulfilled).

According to an embodiment, activating the BM reporting may be triggered by one more events, with or without combination of other triggers (e.g., threshold based and or association with specific DL signals). For example, the one or more events may include when at least one beam failure instance/radio link monitoring (RLM) out-of-sync indication has been provided to upper layers by L1 (or counted by L2).

In one embodiment, when a UE determines that it needs to activate a BM reporting configuration for non-serving cell, the activation of specific reporting setting may be further associated to a specific downlink reference signal of the serving cell. In other words, when reporting configurations are activated based on trigger conditions (such as cell/signal quality), the UE may further consider additional condition, which of the settings are activated based on serving cell conditions. For example, the serving cell conditions may include one of: active TCI state for PDCCH/PDSCH, active TCI state for PDCCH/PDSCH for the lowest/highest control resource set (CORESET) ID, and/or the QCL source RS (CSI-RS/SSB). In one example, when the activation is based on TCI State, a UE may consider only, e.g., TCI state activated for CORESET #0. Alternatively, a UE may consider, e.g., lowest CORESET ID that is not CORESET #0. Specific non-serving cell beam reporting or simply beam reporting configurations may be activated based on the active TCI state, e.g., when reporting setting is configured by network, it is associated with specific set of TCI states (the association may be signaled in the reporting configuration).

In one embodiment, the UE may determine the active reporting configurations upon receiving an activation command from the network. For example, a reporting activation command may be signaled using RRC, MAC CE or downlink control information (DCI). According to an embodiment, the network may signal the UE to activate specific reporting configurations or all of them. In one option, when the network signals the activation command it may cause the UE to provide information, e.g., on which of the reporting configurations are "valid," which may be based on any of the conditions described herein, and may indicate the valid reporting configurations to the network. In some examples, the validity may mean providing information on reporting configurations that have beam measurements above a quality threshold.

In an example embodiment, a UE can be configured to report the information regarding the TRS/CSI-RS of the SCell candidate(s) based on IDLE mode measurements, e.g., upon returning/entering to (RRC) CONNECTED mode. A UE may be indicated/informed by the network the potential occasions where network may transmit TRS/CSI-RS for connected mode user and this information may be used by the IDLE mode UE. An IDLE mode UE may use the TRS occasions to opportunistically measure TRS and may use the measurements for reporting purposes when entering CONNCETED mode or it may use the measurements when selecting random access resources (i.e., TRS/CSI-RS may have been configured with QCL source RS that is an SSB and RA resources may be associated with SSB signals). As a further example, in random access resource selection, a UE may use the quality of the TRS signal or signals to determine if specific SSB is considered to be above threshold quality level and should be considered in the RA selection. In one option, a UE may prioritize the SSBs that it measured TRS (with adequate quality/exceeding the quality threshold) when it determines the RA resources. A UE may perform reporting measurement results (e.g., RSRP) and/or resource index based on all or sub-set measured (and detected) TRS/CSI-RS resources informed in broadcast signaling (e.g., in the SIB) from the selected SCell candidate(s) or a UE may report TRS on the selected cell or on the cell that UE initiated RACH. The reported resources can be further selected or restricted based on configured number (e.g., of best quality) or exceeding threshold (e.g., of the TRS/CSI-RS resource RSRP or corresponding SSB). Reporting of TRS/CSI-RS may be in msg.3 of the RACH procedure (or msg.A in 2-step RACH) or in the RRC signaling during/after RA procedure.

Figure 5A:
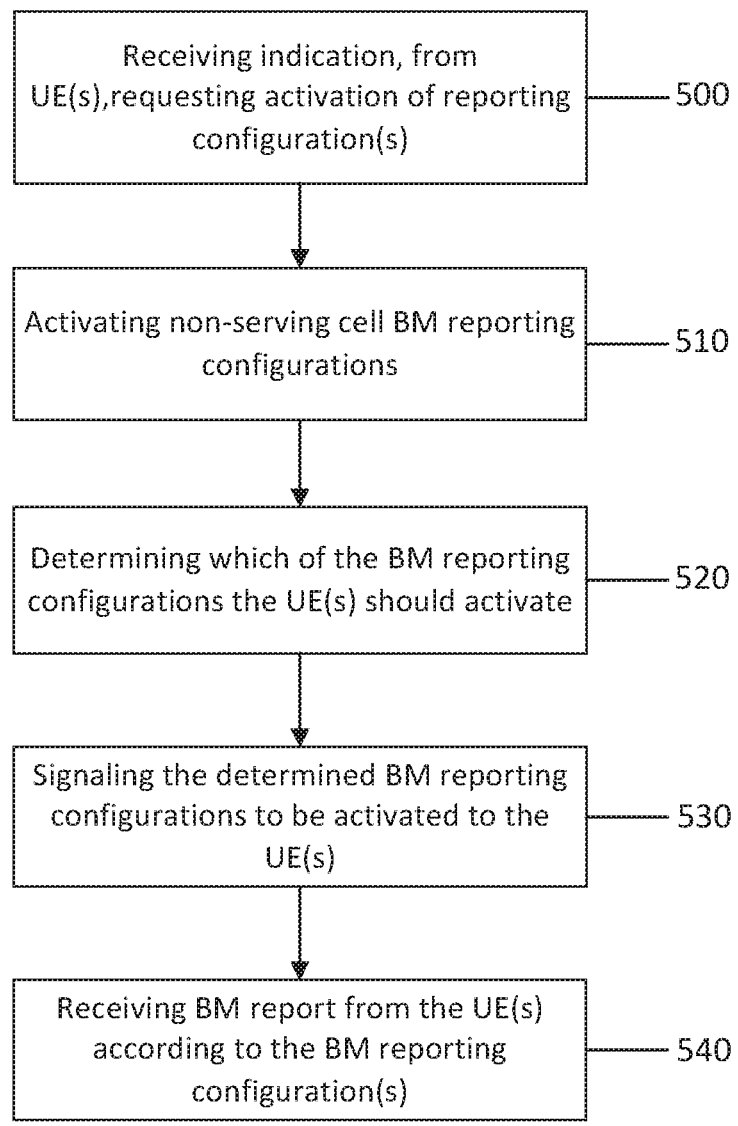
FIG. 5a illustrates an example flow diagram of a method for beam management reporting, according to one example embodiment.

FIG. 5a illustrates an example flow diagram of a method for BM reporting, according to one example embodiment. In an example embodiment, the flow diagram of FIG. 5a may be performed by a network entity or network node associated with a communication system, such as LTE or 5G NR. For instance, in some example embodiments, the network node performing the method of FIG. 5a may include a base station, eNB, gNB, and/or NG-RAN node.

As illustrated in the example of FIG. 5a, the method may include, at 500, receiving an indication, from one or more UE(s), requesting activation of one or more reporting configurations. In an embodiment, the receiving 500 may further include receiving an indication that reporting conditions and/or criteria for at least one non-serving cell BM reporting are fulfilled. In an example embodiment, the indication may be received when the UE(s) has determined to activate the BM reporting configurations. In one example, the serving cell reporting configuration may be preconfigured to the UE(s). In certain embodiments, the receiving 500 may include receiving the indication via a dedicated RACH preamble, dedicated SR, normal SR, MAC CE, and/or PUCCH/PUSCH. According to some embodiments, the receiving 500 of the indication may also be initiated when the UE(s) determines to activate the BM reporting and determines that current signaling resources are not sufficient to carry the information, such as when insufficient PUSCH resources have been allocated.

In one embodiment, the receiving 500 may include receiving an indication of for which cells (PCI/logical cell index in a set of cells) the reporting conditions are fulfilled and/or which of the reporting configurations (configuration IDs corresponding to non-serving cells) should be activated. Additionally, in an embodiment, the receiving 500 may include receiving an indication, for example in L1/L2 beam report, where the UE(s) reports serving cell beams that the UE has detected in any combination or individually: a non-serving cell with quality above a threshold level or serving cell below threshold level or a resource or multiple resources that are associated to specific reporting configurations (that may be associated to specific cell or TRP) have quality level above a threshold level. The threshold level may be a quality/quantity threshold such as RSRP, RSRQ, SINR, SSB-RSRP, CSI-RS-RSRP or the like. The threshold may be set of individual beam (DL RS) or for the cell quality. In certain embodiments, these beams may be associated with the configured reporting configurations (resource sets) or just a candidate set of cells (e.g., UE reports just SSB indexes), or in one example to any cell that the UE(s) has detected. In one example, the indication may be, for example, a 1-bit indication in the report format.

According to an embodiment, the method of FIG. 5a may also include, at 510, activating non-serving cell BM reporting configurations. In some embodiments, the non-serving cells may include one or more of a set of one or more cells preconfigured for beam management signaling based reporting, the preconfigured cells for conditional handover (CHO), and/or any cell up to N cells that the UE has detected. In one embodiment, the method may also include, at 520, determining or deciding which of the BM reporting configurations the UE(s) should activate and, at 530, signaling the determined BM reporting configurations to be activated to the UE(s).

In one embodiment, the UE(s) may activate the non-serving cell BM reporting when it determines that the serving cell quality is below a network configured threshold. For example, in this embodiment, the signaling 530 may include configuring the UE(s) with a new threshold, such as Non-Serving-Cell-BM-Reporting-Threshold (Threshold_BMReporting). Alternatively or additionally, in an embodiment, the signaling 530 may include configuring the UE(s) to use the threshold configured by s-MeasureConfig to determine when to activate the BM reporting. Alternatively or additionally, in an embodiment, for each of the BM reporting configurations, specific neighbor cell beam threshold may be used, e.g., if at least one of the RS listed in the csi-RS-ResourceSetList is above a threshold. In one embodiment, the activating 510 may include providing activation of the non-serving cell BM reporting upon the UE's indication about the preconfigured reporting condition being fulfilled.

In an embodiment, the method may also include, at 540, receiving BM report from the UE(s) according to the BM reporting configuration(s). According to one embodiment, the receiving 540 may include receiving a dynamic report in which the UE(s) generates combined serving and non-serving cell beam report, where the report may include at least one non-serving cell beam index and quality. As an example, when a UE is configured to report up to N=4 best beams in a reporting instance and an indication is provided to the UE to report non-serving cell beams, the UE may determine to change the serving cell reporting configuration so that up to N=2 is reported for the serving cell and up to N=2 is reported for associated non-serving cell resource setting. In an embodiment, the association can be made by linking the reporting configuration to more than one resource setting (serving cell and non-serving cell). In some embodiments, the method may include configuring when this dynamic reporting is active, or the UE may indicate when it reports using this setting.

According to an embodiment, the activating 510 of the BM reporting may be triggered by one more events, with or without combination of other triggers (e.g., threshold based and or association with specific DL signals). For example, the one or more events may include when at least one beam failure instance/radio link monitoring (RLM) out-of-sync indication has been provided to upper layers by L1 (or counted by L2).

In an embodiment, the signaling 530 may include transmitting a reporting activation command, for example, using RRC, MAC CE or DCI. According to an embodiment, the reporting activation command may signal the UE to activate specific reporting configurations or all of them. In one embodiment, the signaling of the activation command may cause the UE to provide information, e.g., on which of the reporting configurations are "valid," which may be based on any of the conditions described herein, and may indicate the valid reporting configurations. In some embodiments, the indication of validity may provide information on reporting configurations that have beam measurements above a quality threshold.

In an example embodiment, the method may include configuring the UE to report the information regarding the TRS/CSI-RS of the SCell candidate(s) based on IDLE mode measurements, e.g., upon returning to CONNECTED mode. This may include reporting measurement results (e.g., RSRP) and/or resource index based on all or sub-set measured (and detected) TRS/CSI-RS resources informed in broadcast from the selected SCell candidate(s). The reported resources can be further selected or restricted based on configured number (e.g., of best quality) or exceeding a threshold (e.g., of the TRS/CSI-RS resource RSRP or corresponding SSB).

Figure 5B:
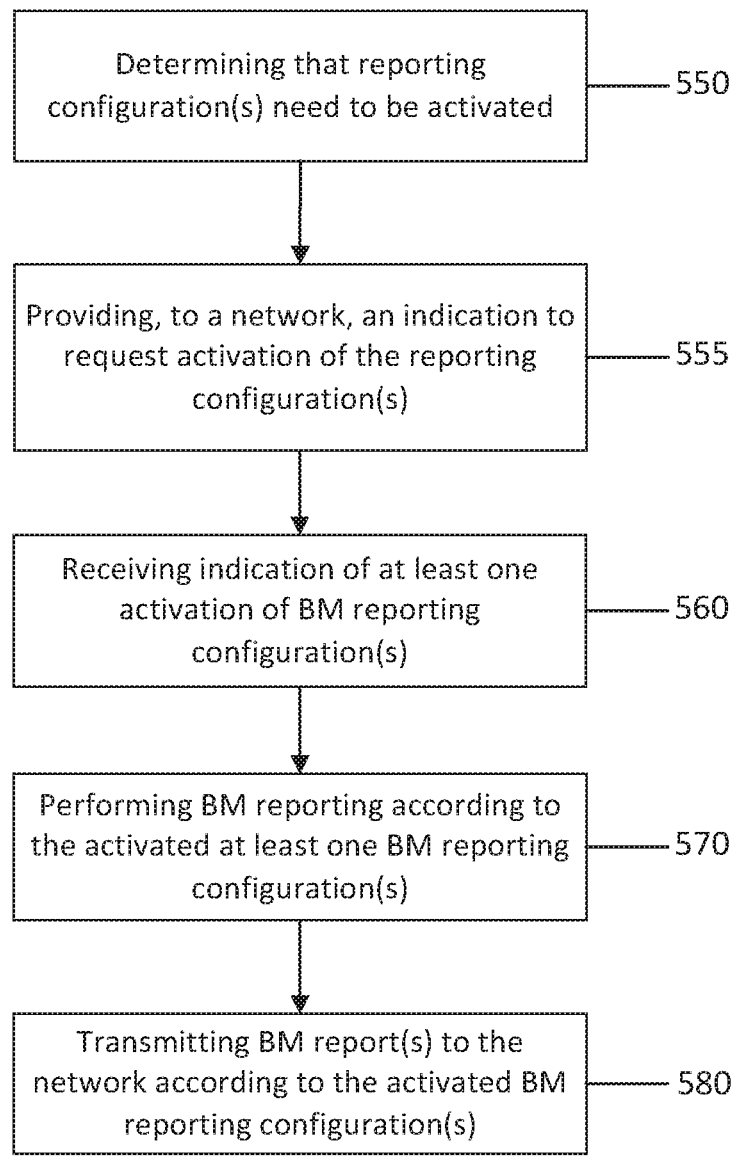
FIG. 5b illustrates an example flow diagram of a method for beam management reporting, according to one example embodiment.

FIG. 5b illustrates an example flow diagram of a method for BM reporting, according to one example embodiment. In certain example embodiments, the flow diagram of FIG. 5b may be performed by a network entity or network node associated with a communications system, such as LTE or 5G NR. For instance, in some example embodiments, the network entity performing the method of FIG. 5b may include a UE, mobile station, mobile device, IoT device, or the like.

In an embodiment, the method of FIG. 5b may include, at 550, determining that one or more reporting configuration(s) should or need to be activated. According to an embodiment, the method may also include, at 555, providing, to a network, an indication to request activation of the reporting configuration(s). In one embodiment, the providing 555 may include signaling the network to indicate that it has been determined that reporting conditions and/or criteria for at least one non-serving cell BM reporting are fulfilled. For example, in one embodiment, the providing 555 may be triggered when it is determined to activate the BM reporting configurations. In one example, the serving cell reporting configuration may be preconfigured. In certain embodiments, the providing 555 may include one or more of a dedicated RACH preamble, dedicated SR, normal SR, MAC CE, and/or PUCCH/PUSCH. In some embodiments, a specific UL signal (RACH preamble (such as CFRA/CBRA), dedicated SR for reporting configuration, normal SR, dedicated SR, sounding reference signal (SRS) or the like may be associated specifically with one or more reporting configuration (e.g., it may be specific to reporting configurations for specific cells, TRPs and so on). In one example, a signal or any indication may correspond to one or more or all non-serving cell reporting configurations. Based on the determination which configurations to activate, the UE may trigger uplink signaling based on the configured association. In some cases, UE may determine which configurations to activate based on RRC level events (e.g. based on cell quality measurements and configured events (if any) as described herein) and determine to trigger indication using the UL signals, or UL messages as described in various embodiments. According to some embodiments, the providing 555 may also be initiated when the UE determines to activate the BM reporting and determines that current signaling resources are not sufficient to carry the information, e.g., where insufficient PUSCH resources are allocated by the network.

In one embodiment, the providing 555 may include providing an indication of for which cells (PCI/logical cell index in a set of cells) the reporting conditions are fulfilled and/or which of the reporting configurations (configuration IDs corresponding to non-serving cells) should be activated. Further, in an embodiment, the providing 555 may include providing an indication of, for example in L1/L2 beam report, where the UE reports serving cell beams that the UE has detected non-serving cell beam or beams that have signal quality above threshold level (such as RSRP/RSRQ/SINR). In certain embodiments, these beams may be associated with the configured reporting configurations (resource sets) or just a candidate set of cells (e.g., UE reports just SSB indexes), or in one example to any cell that the UE has detected. In one example, the indication may be, e.g., 1-bit indication in the report format.

According to an embodiment, the method of FIG. 5b may also include, at 560, receiving an indication of at least one activation of the BM reporting configuration(s) and, at 570, performing the BM reporting according to the activated at least one BM reporting configuration. In one embodiment, the performing 570 may include performing the non-serving cell BM reporting when the UE determines that the serving cell quality is below a network configured threshold. For example, the network may configure the UE with a new threshold, such as Non-Serving-Cell-BM-Reporting-Threshold (Threshold_BMReporting). Alternatively or additionally, the UE may be configured to use, or the threshold configured by s-MeasureConfig may be used to determine when to activate the BM reporting. Alternatively or additionally, for each of the BM reporting configurations, specific neighbor cell beam threshold may be used, e.g., if at least one of the RS listed in the csi-RS-ResourceSetList is above a threshold. In one alternative, the receiving 560 may include receiving the activation of the non-serving cell BM reporting, for example, upon the UE's indication about the preconfigured reporting condition being fulfilled.

According to one embodiment, the method may also include, at 580, transmitting at least one BM report to the network according to the activated BM reporting configuration(s). In an embodiment, the transmitting 580 may include providing a dynamic report generated using combined serving and non-serving cell beam report, where the report may include at least one non-serving cell beam index and quality. As an example, when the UE is configured to report up to N=4 best beams in a reporting instance and it receives a network indication to report non-serving cell beams, the UE may determine to change the serving cell reporting configuration so that up to N=2 is reported for the serving cell and up to N=2 is reported for associated non-serving cell resource setting. This may be extended so that, e.g., N=2 for serving cell, and N=1 per one non-serving cell (up to two cells) and so on. This association can be made by linking the reporting configuration to more than one resource setting (serving cell and non-serving cell). In some embodiments, the method may include indicating to the network when reporting is performed using this setting.

According to an embodiment, the determining 550 that BM reporting configurations should be activated may be triggered by one more events, with or without combination of other triggers (e.g., threshold based and or association with specific DL signals). For example, the one or more events may include when at least one beam failure instance/radio link monitoring (RLM) out-of-sync indication has been provided to upper layers by L1 (or counted by L2).

In one embodiment, when determining that a BM reporting configuration for non-serving cell should be activated, a specific reporting setting may be activated, where that specific reporting setting may be further associated to a specific downlink reference signal of the serving cell. For instance, when reporting configurations are activated based on trigger conditions, it may be determined which of the settings are activated based on serving cell conditions. For example, the serving cell conditions may include one of: active TCI state for PDCCH/PDSCH, active TCI state for PDCCH/PDSCH for the lowest/highest control resource set (CORESET) ID, and/or the QCL source RS (CSI-RS/SSB). Specific non-serving cell reporting configurations may be activated based on the active TCI state, e.g., when reporting setting is configured by network, it is associated with specific set of TCI states (the association may be signaled in the reporting configuration).

In one embodiment, the method may include determining the active reporting configurations upon receiving an activation command from the network. For example, a reporting activation command may be signaled using RRC, MAC CE or downlink control information (DCI). According to an embodiment, the network may signal the UE to activate specific reporting configurations or all of them. In one option, when the network signals the activation command, the method may further include providing information, such as information on which of the reporting configurations are "valid," which may be based on any of the conditions described herein, and indicating the valid reporting configurations to the network. In some examples, the validity may refer to providing information on reporting configurations that have beam measurements above a quality threshold.

In an example embodiment, the method may include reporting, to the network, the information regarding the TRS/CSI-RS of the SCell candidate(s) based on IDLE mode measurements, e.g., upon returning to CONNECTED mode. This may include reporting measurement results (e.g., RSRP) and/or resource index based on all or sub-set measured (and detected) TRS/CSI-RS resources informed in broadcast from the selected SCell candidate(s). The reported resources can be further selected or restricted based on configured number (e.g., of best quality) or exceeding threshold (e.g., of the TRS/CSI-RS resource RSRP or corresponding SSB).

Figure 6A:
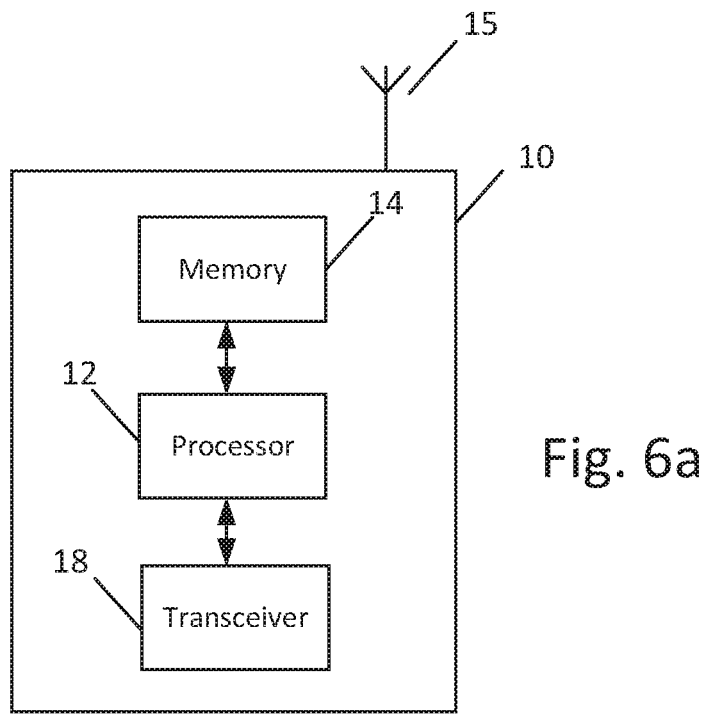
FIG. 6a illustrates an example block diagram of an apparatus, according to an embodiment.

FIG. 6a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be or may include a NG-RAN node, an eNB in LTE, gNB in 5G, or the like.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6a.

As illustrated in the example of FIG. 6a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6a, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (for example, digital-to-analog converters and the like), mappers, a Fast Fourier Transform (FFT) module, and/or the like, e.g., to generate symbols for transmission via one or more downlinks and to receive symbols (for example, via an uplink)

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. For example, in some embodiments, apparatus 10 may be configured to perform one or more of the processes depicted in any of the flow charts or signaling diagrams described herein, such as those illustrated in FIG. 5a or 5b. In some embodiments, as discussed herein, apparatus 10 may be configured to perform a procedure relating to BM reporting, for example, in L1/L2 -centric mobility.

In one embodiment, apparatus 10 may be controlled by memory 14 and processor 12 to receive an indication, from one or more UE(s), to request activation of one or more reporting configuration(s). For example, in an embodiment, apparatus 10 may be controlled by memory 14 and processor 12 to receive an indication that reporting conditions and/or criteria for at least one non-serving cell BM reporting are fulfilled. In an example embodiment, the indication may be received when the UE(s) has determined to activate the BM reporting configurations. In one example, the serving cell reporting configuration may be preconfigured to the UE(s). In certain embodiments, apparatus 10 may be controlled by memory 14 and processor 12 to receive the indication via a dedicated RACH preamble, dedicated SR signal, normal SR, MAC CE, and/or PUCCH/PUSCH. According to some embodiments, the receipt of the indication may also be initiated when the UE(s) determines to activate the BM reporting and determines that current signaling resources are not sufficient to carry the information, such as when insufficient PUSCH resources have been allocated.

In one embodiment, apparatus 10 may be controlled by memory 14 and processor 12 to receive an indication of for which cells (PCI/logical cell index in a set of cells) the reporting conditions are fulfilled and/or which of the reporting configurations (configuration IDs corresponding to non-serving cells) should be activated. Additionally, in an embodiment, apparatus 10 may be controlled by memory 14 and processor 12 to receive an indication, for example in L1/L2 beam report, where the UE(s) reports serving cell beams that the UE has detectednon-serving cell (or a cell) beams above quality threshold. In certain embodiments, these beams may be associated with the configured reporting configurations (resource sets) or just a candidate set of cells (e.g., UE reports just SSB indexes), or in one example to any cell that the UE(s) has detected. In one example, the indication may be, for example, a 1-bit indication in the report format.

According to an embodiment, apparatus 10 may be controlled by memory 14 and processor 12 to activate non-serving cell BM reporting configurations. In some embodiments, the non-serving cells may include one or more of a set of one or more cells preconfigured for beam management signaling based reporting, the preconfigured cells for conditional handover (CHO), and/or any cell up to N cells that the UE has detected. In one embodiment, apparatus 10 may be controlled by memory 14 and processor 12 to determine or decide which of the BM reporting configurations the UE(s) should activate, and to signal the determined BM reporting configurations to be activated to the UE(s).

In one embodiment, the UE(s) may active the non-serving cell BM reporting when it determines that the serving cell quality is below a network configured threshold. For example, in this embodiment, apparatus 10 may be controlled by memory 14 and processor 12 to configure the UE(s) with a new threshold, such as Non-Serving-Cell-BM-Reporting-Threshold (Threshold_BMReporting). Alternatively or additionally, in an embodiment, apparatus 10 may be controlled by memory 14 and processor 12 to configure the UE(s) to use the threshold configured by s-MeasureConfig to determine when to activate the BM reporting. Alternatively or additionally, in an embodiment, for each of the BM reporting configurations, specific neighbor cell beam threshold may be used, e.g., if at least one of the RS listed in the csi-RS-ResourceSetList is above a threshold. In one embodiment, apparatus 10 may be controlled by memory 14 and processor 12 to provide activation of the non-serving cell BM reporting upon the UE's indication about the preconfigured reporting condition being fulfilled.

In an embodiment, apparatus 10 may be controlled by memory 14 and processor 12 to receive at least one BM report from the UE according to the BM reporting configuration(s). According to one embodiment, apparatus 10 may be controlled by memory 14 and processor 12 to receive a dynamic report in which the UE(s) generates combined serving and non-serving cell beam report, where the report may include at least one non-serving cell beam index and quality. As an example, when a UE is configured to report up to N=4 best beams in a reporting instance and an indication is provided to the UE to report non-serving cell beams, the UE may determine to change the serving cell reporting configuration so that up to N=2 is reported for the serving cell and up to N=2 is reported for associated non-serving cell resource setting. In an embodiment, the association can be made by linking the reporting configuration to more than one resource setting (serving cell and non-serving cell). In some embodiments, apparatus 10 may be controlled by memory 14 and processor 12 to configure when this dynamic reporting is active, or to receive an indication from the UE when it reports using this setting.

According to an embodiment, the activation of the BM reporting may be triggered by one more events, with or without combination of other triggers (e.g., threshold based and or association with specific DL signals). For example, the one or more events may include when at least one beam failure instance/radio link monitoring (RLM) out-of-sync indication has been provided to upper layers by L1 (or counted by L2).

In an embodiment, apparatus 10 may be controlled by memory 14 and processor 12 to transmit a reporting activation command, for example, using RRC, MAC CE or DCI. According to an embodiment, the reporting activation command may signal the UE to activate specific reporting configurations or all of them. In one embodiment, the signaling of the activation command may cause the UE to provide information, e.g., on which of the reporting configurations are "valid," which may be based on any of the conditions described herein, and may indicate the valid reporting configurations. In some embodiments, the indication of validity may provide information on reporting configurations that have beam measurements above a quality threshold.

In an example embodiment, apparatus 10 may be controlled by memory 14 and processor 12 to configure the UE to report the information regarding the TRS/CSI-RS of the SCell candidate(s) based on IDLE mode measurements, e.g., upon returning to CONNECTED mode. This may include reporting measurement results (e.g., RSRP) and/or resource index based on all or sub-set measured (and detected) TRS/CSI-RS resources informed in broadcast from the selected SCell candidate(s). The reported resources can be further selected or restricted based on configured number (e.g., of best quality) or exceeding a threshold (e.g., of the TRS/CSI-RS resource RSRP or corresponding SSB).

Figure 6B:
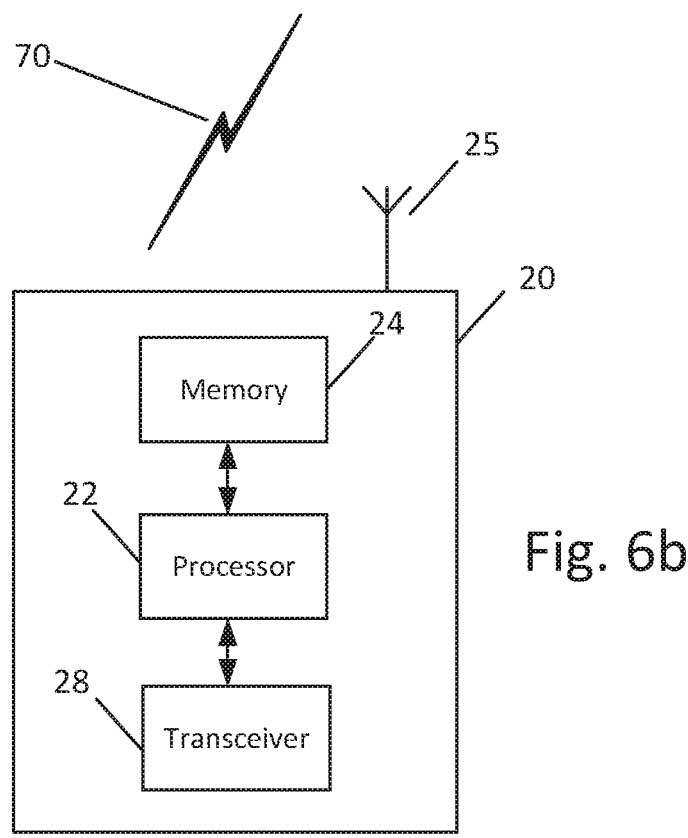
FIG. 6b illustrates an example block diagram of an apparatus, according to an embodiment.

FIG. 6b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6b.

As illustrated in the example of FIG. 6b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6b, multiple processors may be utilized according to other example embodiments. For example, it should be understood that, in certain embodiments, apparatus 20 may include two or more processors that may form a multiprocessor system (e.g., in this case processor 22 may represent a multiprocessor) that may support multiprocessing. In some embodiments, the multiprocessor system may be tightly coupled or loosely coupled (e.g., to form a computer cluster).

Processor 22 may perform functions associated with the operation of apparatus 20 including, as some non-limiting examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and/or for transmitting via an uplink from apparatus 20. According to certain embodiments, apparatus 20 may further include a transceiver 28 configured to transmit and receive information. In one example, the transceiver 28 may also include a radio interface (e.g., a modem) coupled to the antenna 25. In some embodiments, the radio interface may correspond to a plurality of radio access technologies including one or more of GSM, LTE, LTE-A, 5G, NR, WLAN, NB-IoT, Bluetooth, BT-LE, NFC, RFID, UWB, and the like. In further example embodiments, the radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink For instance, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and/or memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 5a or 5b. In certain embodiments, apparatus 20 may include or represent a UE and may be configured to perform a procedure relating to BM reporting, for example, in L1/L2-centric mobility.

In certain embodiments, apparatus 20 may be controlled by memory 24 and processor 22 to determine that reporting configuration(s) should or need to be activated. According to an embodiment, apparatus 20 may be controlled by memory 24 and processor 22 to provide, to a network, an indication to request activation of the reporting configuration(s). For example, in an embodiment, apparatus 20 may be controlled by memory 24 and processor 22 to signal or transmit an indication to the network to indicate that it has been determined that reporting conditions and/or criteria for at least one non-serving cell BM reporting are fulfilled. For example, in one embodiment, the providing of the indication may be triggered when apparatus 20 determines to activate the BM reporting configurations. In one example, the serving cell reporting configuration may be preconfigured. In certain embodiments, the providing of the indication may be performed via one or more of a dedicated RACH preamble, dedicated SR signal, normal SR, MAC CE, and/or PUCCH/PUSCH. According to some embodiments, the providing of the indication may also be initiated when the apparatus 20 determines to activate the BM reporting and determines that current signaling resources are not sufficient to carry the information, e.g., where insufficient PUSCH resources are allocated by the network.

In one embodiment, the indication to the network may include an indication of for which cells (PCI/logical cell index in a set of cells) the reporting conditions are fulfilled and/or which of the reporting configurations (configuration IDs corresponding to non-serving cells) should be activated. Further, in an embodiment, the indication may include an indication of, for example in L1/L2 beam report, where the apparatus 20 reports serving cell beams that the apparatus 20 has detected non-serving cell (or just a cell with) beam or beams above quality threshold. Quality threshold may be a RSRP/RSRQ threshold, and it may be configured by network. In certain embodiments, these beams may be associated with the configured reporting configurations (resource sets) or just a candidate set of cells (e.g., UE reports just SSB indexes), or in one example to any cell that the apparatus 20 has detected. In one example, the indication may be, e.g., 1-bit indication in the report format.

According to an embodiment, apparatus 20 may be controlled by memory 24 and processor 22 to receive an indication of at least one activation of the BM reporting configuration(s), and to perform the BM reporting according to the activated BM configuration(s). In one embodiment, apparatus 20 may be controlled by memory 24 and processor 22 to perform the non-serving cell BM reporting when the apparatus 20 determines that the serving cell quality is below a network configured threshold. For example, the network may configure the apparatus 20 with a new threshold, such as Non-Serving-Cell-BM-Reporting-Threshold (Threshold_BMReporting). Alternatively or additionally, the apparatus 20 may be configured to use the threshold configured by s-MeasureConfig to determine when to activate the BM reporting. Alternatively or additionally, for each of the BM reporting configurations, a specific neighbor cell beam threshold may be used, e.g., if at least one of the RS listed in the csi-RS-ResourceSetList is above a threshold. In one alternative, apparatus 20 may be controlled by memory 24 and processor 22 to receive the activation of the non-serving cell BM reporting, for example, upon the indication by apparatus 20 about the preconfigured reporting condition being fulfilled.

According to one embodiment, apparatus 20 may be controlled by memory 24 and processor 22 to provide or transmit at least one BM report to the network according to the activated BM reporting configuration(s). In an embodiment, apparatus 20 may be controlled by memory 24 and processor 22 to provide a dynamic report generated using combined serving and non-serving cell beam report, where the report may include at least one non-serving cell beam index and quality. As an example, when the apparatus 20 is configured to report up to N=4 best beams in a reporting instance and it receives a network indication to report non-serving cell beams, the apparatus 20 may determine to change the serving cell reporting configuration so that up to N=2 is reported for the serving cell and up to N=2 is reported for associated non-serving cell resource setting. This may be extended so that, e.g., N=2 for serving cell, and N=1 per one non-serving cell (up to two cells) and so on. This association can be made by linking the reporting configuration to more than one resource setting (serving cell and non-serving cell). In some embodiments, apparatus 20 may be controlled by memory 24 and processor 22 to indicate to the network when reporting is performed using this setting.

According to an embodiment, the determination that the BM reporting configuration(s) should be activated may be triggered by one more events, with or without combination of other triggers (e.g., threshold based and or association with specific DL signals). For example, the one or more events may include when at least one beam failure instance/radio link monitoring (RLM) out-of-sync indication has been provided to upper layers by L1 (or counted by L2).

In one embodiment, when determining that a BM reporting configuration for non-serving cell should be activated, apparatus 20 may be controlled by memory 24 and processor 22 to activate a specific reporting setting that may be further associated to a specific downlink reference signal of the serving cell. For instance, when reporting configurations are activated based on trigger conditions, it may be determined which of the settings are activated based on serving cell conditions. For example, the serving cell conditions may include one of: active TCI state for PDCCH/PDSCH, active TCI state for PDCCH/PDSCH for the lowest/highest control resource set (CORESET) ID, and/or the QCL source RS (CSI-RS/SSB). Specific non-serving cell reporting configurations may be activated based on the active TCI state, e.g., when reporting setting is configured by network, it is associated with specific set of TCI states (the association may be signaled in the reporting configuration).

In one embodiment, apparatus 20 may be controlled by memory 24 and processor 22 to determine the active reporting configurations upon receiving an activation command from the network. For example, a reporting activation command may be signaled using RRC, MAC CE or downlink control information (DCI). According to an embodiment, the network may signal the apparatus 20 to activate specific reporting configurations or all of them. In one option, when the network signals the activation command, apparatus 20 may be controlled by memory 24 and processor 22 to provide information, such as information on which of the reporting configurations are "valid," which may be based on any of the conditions described herein, and to indicate the valid reporting configurations to the network. In some examples, the validity may refer to providing information on reporting configurations that have beam measurements above a quality threshold.

In an example embodiment, apparatus 20 may be controlled by memory 24 and processor 22 to report, to the network, the information regarding the TRS/CSI-RS of the SCell candidate(s) based on IDLE mode measurements, e.g., upon returning to CONNECTED mode. This may include reporting measurement results (e.g., RSRP) and/or resource index based on all or sub-set measured (and detected) TRS/CSI-RS resources informed in broadcast from the selected SCell candidate(s). The reported resources can be further selected or restricted based on configured number (e.g., of best quality) or exceeding threshold (e.g., of the TRS/CSI-RS resource RSRP or corresponding SSB).

Further embodiments may provide means for performing any of the functions, steps or procedures described herein. For example, one embodiment may be directed to an apparatus that includes means for receiving an indication, from one or more UE(s), requesting activation of one or more reporting configuration(s), means for determining at least one BM reporting configuration that the UE(s) should activate, and means for signaling the determined at least one BM reporting configuration to the UE(s).

As another example, an embodiment may be directed to an apparatus that includes means for determining that one or more reporting configuration(s) need to be activated, and means for providing, to a network, an indication to request activation of the reporting configuration(s). In some embodiments, the apparatus may also include means for receiving, from the network, at least one activation of beam management reporting configuration, and means for performing beam management reporting according to the activated at least one beam management reporting configurations.

Therefore, certain example embodiments provide several technological improvements, enhancements, and/or advantages over existing technological processes and constitute an improvement at least to the technological field of wireless network control and management. For example, certain embodiments provide methods for beam management reporting in L1/L2 centric mobility. In one embodiment, methods are provided for reporting neighbor cell measurements using the beam management framework. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:
   at least one processor; and
   at least one memory comprising computer program code,
   the at least one memory and computer program code configured, with the at least one processor, to cause the apparatus at least to:
   determine at least one reporting configuration needs to be activated, wherein the determination that the at least one reporting configuration needs to be activated is triggered by at least one event, wherein the at least one event comprises when at least one beam failure instance or radio link monitoring (RLM) out-of-sync indication has been provided to upper layers by layer 1 (L1) or counted by layer 2 (L2);
   provide, to a network, a first indication to activate the at least one reporting configuration,
      wherein when providing the first indication, the apparatus signals, to the network, a second indication that reporting criteria for at least one non-serving cell beam management reporting are fulfilled,
      wherein the at least one reporting configuration is preconfigured,
      wherein the first indication includes a dedicated random access channel (RACH) preamble, dedicated scheduling request (SR), normal SR, medium access control (MAC) control element (CE), and physical uplink control channel (PUCCH)/physical uplink shared channel (PUSCH),
      wherein at least one of a specific uplink (UL) signal, the dedicated SR, the normal SR, or a sounding reference signal (SRS) is associated with the at least one reporting configuration, and
      wherein the first indication corresponds to at least one non-serving cell beam management reporting configuration;
   receive, from the network, a configuration of a first threshold used for determining when to activate beam management reporting, wherein the first threshold includes: a set of individual beam downlink reference signals (DL RS) for cell quality;
   receive, from the network, signaling including at least one activation of the at least one non-serving cell beam management reporting configuration, based on determining that a serving cell quality is below a second threshold configured by the network, the signaling further providing:
      a serving cell quality threshold, used by the apparatus to determine when the serving cell quality is low enough to trigger the at least one activation of the at least one non-serving cell beam management reporting configuration,
      for each of the at least one non-serving cell beam management reporting configuration, a neighbor cell beam quality threshold, used by the apparatus to determine whether a neighbor cell beam reference signal satisfies a first condition for activating the at least one non-serving cell beam management reporting configuration,
      a reporting threshold, used by the apparatus to determine when to perform beam management reporting according to the at least one activated non-serving cell beam management reporting configuration, and
      a reference signal quality threshold, applied by the apparatus to at least one reference signal associated with a resource in a resource set for a non-serving cell, to determine whether the reference signal quality satisfies a second condition for activating the at least one non-serving cell beam management reporting configuration,
      wherein the at least one activation of the at least one non-serving cell beam management reporting configuration includes enabling beam management reporting of the at least one non-serving cell when the apparatus has indicated that a preconfigured reporting condition has been fulfilled;
   perform beam management reporting according to the activated at least one non-serving cell beam management reporting configuration, wherein the performing occurs when the apparatus determines that the serving cell quality is below the first threshold; and
   transmit, to the network, a beam management report according to the activated at least one non-serving cell beam management reporting configuration,
      wherein the beam management report comprises a dynamic report comprising a combined serving and non-serving cell beam report, wherein the dynamic report comprises at least one non-serving cell beam index and quality.

* * * * *